(12) United States Patent
Kim

(10) Patent No.: US 10,351,123 B2
(45) Date of Patent: Jul. 16, 2019

(54) METHOD FOR CONTROLLING HYBRID VEHICLE

(71) Applicant: HYUNDAI MOTOR COMPANY, Seoul (KR)

(72) Inventor: Sang Joon Kim, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 305 days.

(21) Appl. No.: 15/368,078

(22) Filed: Dec. 2, 2016

(65) Prior Publication Data
US 2018/0056976 A1 Mar. 1, 2018

(30) Foreign Application Priority Data

Sep. 1, 2016 (KR) .................. 10-2016-0112633

(51) Int. Cl.
*B60W 20/13* (2016.01)
*B60W 20/40* (2016.01)
(Continued)

(52) U.S. Cl.
CPC ............. *B60W 20/13* (2016.01); *B60K 6/387* (2013.01); *B60K 6/442* (2013.01); *B60W 20/20* (2013.01); *B60W 20/40* (2013.01); *B60K 2006/268* (2013.01); *B60W 2510/0638* (2013.01); *B60W 2510/244* (2013.01); *B60W 2510/305* (2013.01); *B60W 2520/04* (2013.01);
(Continued)

(58) Field of Classification Search
None
See application file for complete search history.

(56) References Cited

U.S. PATENT DOCUMENTS 7,463,958 B2    12/2008   Suzuki
2004/0045753 A1* 3/2004  Yamaguchi ............ B60K 6/445
                                                            180/65.28
(Continued)

FOREIGN PATENT DOCUMENTS

JP      07284201 A  * 10/1995
JP   2007-223458 A     9/2007
(Continued)

OTHER PUBLICATIONS

Hanyu, Machine Translation of JP-2009274611-A, Nov. 2009, espacenet.com (Year: 2009).*

(Continued)

*Primary Examiner* — David P. Merlino
(74) *Attorney, Agent, or Firm* — Morgan Lewis & Bockius LLP

(57) ABSTRACT

A method for controlling a hybrid vehicle includes the steps of: (a) determining whether or not a subject vehicle is running or stopped, when the subject vehicle is in an electric vehicle (EV) mode and is driven by power of a driving motor, and (b) adjusting a target state of charge (SOC) of a battery depending on whether or not the subject vehicle is running or stopped, wherein, when it is determined that the subject vehicle is running in step (a), the target SOC is adjusted to a predetermined running SOC in step (b), and when it is determined that the subject vehicle is stopped in step (a), the target SOC is adjusted to a predetermined stop SOC that is less than the running SOC in step (b).

10 Claims, 6 Drawing Sheets

(51) Int. Cl.
*B60K 6/387* (2007.10)
*B60K 6/442* (2007.10)
*B60W 20/20* (2016.01)
*B60K 6/26* (2007.10)

(52) U.S. Cl.
CPC ... *B60W 2520/10* (2013.01); *B60W 2550/142* (2013.01); *B60W 2550/302* (2013.01); *B60W 2550/308* (2013.01); *B60W 2710/081* (2013.01); *B60W 2710/244* (2013.01); *Y02T 10/6234* (2013.01); *Y10S 903/903* (2013.01); *Y10S 903/914* (2013.01)

(56) References Cited

U.S. PATENT DOCUMENTS

| | | | |
|---|---|---|---|
| 2006/0033469 A1* | 2/2006 | Beaty | B60L 3/0046 320/104 |
| 2012/0265382 A1* | 10/2012 | Nefcy | B60W 10/06 701/22 |
| 2013/0066495 A1* | 3/2013 | Furuta | B60L 11/123 701/22 |
| 2013/0297193 A1 | 11/2013 | Morisaki | |
| 2014/0039744 A1* | 2/2014 | Morisaki | B60K 6/445 701/22 |
| 2015/0005998 A1* | 1/2015 | Choi | B60L 11/1862 701/22 |
| 2016/0096521 A1 | 4/2016 | Jang | |
| 2018/0147931 A1* | 5/2018 | Toyota | B60K 6/442 |
| 2018/0290646 A1* | 10/2018 | Graf | B60W 10/119 |

FOREIGN PATENT DOCUMENTS

| | | | |
|---|---|---|---|
| JP | 2009274611 A | * | 11/2009 |
| JP | 2010-202119 A | | 9/2010 |
| JP | 2011-131827 A | | 7/2011 |
| JP | 5010378 B2 | | 8/2012 |
| JP | 5585666 B2 | | 9/2014 |
| KR | 10-1583996 B1 | | 1/2016 |
| WO | 2012-098658 A1 | | 7/2012 |

OTHER PUBLICATIONS

Korean Office Action issued in Korean Patent Application No. 10-2016-0112633, dated Jun. 8, 2017.

* cited by examiner

METHOD FOR CONTROLLING HYBRID VEHICLE

CROSS-REFERENCE TO RELATED APPLICATION

This application claims the benefit of priority to Korean Patent Application No. 10-2016-0112633, filed on Sep. 1, 2016 with the Korean Intellectual Property Office, the disclosure of which is incorporated herein in its entirety by reference.

TECHNICAL FIELD

The present disclosure relates to a method for controlling a hybrid vehicle.

BACKGROUND

Possible goals in vehicle development are eco-friendly policies and fuel efficiency improvements due to worldwide high oil prices and emission control goals. Accordingly, vehicle makers have made much effort to comply with eco-friendly policies and develop technologies for fuel savings and emissions reductions in order to improve fuel efficiency.

Under the aforementioned circumstances, vehicle makers pay much attention and effort to technical developments of hybrid electric vehicles (HEVs) that use an efficient combination of distinct types of power from an engine and a motor for achieving high fuel efficiency. HEVs satisfy the needs of many customers with high fuel efficiency and eco-friendliness.

FIG. 1 schematically illustrates a configuration of a hybrid vehicle.

Referring to FIG. 1, a hybrid vehicle includes an engine 10 and a driving motor 12 arranged in series, an engine clutch 13 disposed between the engine 10 and the driving motor 12 to make the synchronized connection or disconnection of the engine 10 and the driving motor 12, an automatic transmission 14 providing speed and torque conversions from a power source, i.e., the driving motor 12 or both the driving motor 12 and the engine 10 to driving wheels 30, a hybrid starter generator (HSG) 16 that is a type of motor connected to a crank pulley of the engine 10 through a belt 11 to enable power transmission for engine starting and power generation, an inverter 18 for motor control (control of the motor 12 and the HSG 16) and power generation control, and a high-voltage battery 20 chargeably and dischargeably connected to the inverter 18 to supply power to the motors 12 and 16 and electrical components of the vehicle.

The aforementioned hybrid vehicle is called a transmission mounted electric device (TIED) in which the driving motor 12 is mounted at the automatic transmission 14.

The hybrid vehicle further includes a hybrid control unit (HCU) for controlling the overall operations of the hybrid vehicle, and a battery control unit (BCU) for managing and controlling the battery 20. The BCU is also called a battery management system (BMS).

The hybrid vehicle may provide driving modes, such as an electric vehicle (EV) mode which is a pure electric vehicle mode using only the power of the driving motor 12, a hybrid electric vehicle (HEV) mode which uses the driving motor 12 as an auxiliary power source while using the engine 10 as a main power source, and a regenerative braking (RB) mode which recovers braking and inertial energy of the vehicle through generation from the driving motor 12 during braking operations or inertia of the vehicle and charges the battery 20 with the recovered energy.

In the HEV mode, the vehicle is run by the sum of the output torque of the engine 10 and the output torque of the driving motor 12 through the lock-up of the engine clutch 13. In the EV mode, the vehicle is only run by the output torque of the driving motor 12 through the opening of the engine clutch 13.

Meanwhile, a conventional hybrid vehicle performs power generation by driving an HSG using the power of an engine to charge a battery, when the conventional hybrid vehicle is running in EV mode and the state of charge (SOC) of the battery is less than or equal to a predetermined target SOC. In other words, in an idle state of the engine that is not connected to a driving motor in the synchronized manner, electrical load for power generation is applied to the HSG connected to the engine to charge the battery. Hereinafter, for convenience of explanation, this power generation method is referred to as "idle generation".

In the idle generation, however, the engine is driven at low rpm (revolutions per minute) and low torque, and in general, the capacity of the HSG is smaller than that of the driving motor. Therefore, the conventional hybrid vehicle may suffer from reductions in fuel efficiency of the engine and power generation efficiency due to the idle generation.

SUMMARY

The present disclosure has been made to solve the above-mentioned problems occurring in the prior art while advantages achieved by the prior art are maintained intact.

An aspect of the present disclosure provides a method for controlling a hybrid vehicle that minimizes the frequency of idle generation.

Another aspect of the present disclosure provides a method for controlling a hybrid vehicle in which power generation and charging schemes vary depending on whether or not the vehicle is running or stopped.

Another aspect of the present disclosure provides a method for controlling a hybrid vehicle that minimizes energy loss caused by the charging and discharging of a battery.

According to an aspect of the present disclosure, a method for controlling a hybrid vehicle includes the steps of: (a) determining whether or not a subject vehicle is running or stopped, when the subject vehicle is in an electric vehicle (EV) mode which is driven by power of a driving motor; and (b) adjusting a target state of charge (SOC) of a battery depending on whether or not the subject vehicle is running or stopped, wherein when it is determined that the subject vehicle is running in step (a), the target SOC is adjusted to a predetermined running SOC in step (b), and when it is determined that the subject vehicle is stopped in step (a), the target SOC is adjusted to a predetermined stop SOC that is less than the running SOC in step (b).

The method may further include the steps of: (c) comparing the target SOC with a current SOC of the battery when the target SOC is adjusted to the running SOC in step (b); and (d) performing power generation using power of an engine when it is determined that the current SOC of the battery is less than the target SOC in step (c).

The power generation in step (d) may be performed when a predetermined delay condition is satisfied in a state in which the subject vehicle is waiting to perform the power generation for a predetermined delay time.

The delay condition may include a condition in which a distance between the subject vehicle and a preceding vehicle in front of the subject vehicle is greater than or equal to a predetermined reference distance, and the delay time may be determined to be increased as the distance between the subject vehicle and the preceding vehicle is increased.

The delay condition may include a condition in which a running speed of a preceding vehicle in front of the subject vehicle is faster than or equal to a predetermined reference speed, and the delay time may be determined to be increased as the running speed is increased.

The delay condition may include a condition in which a road on which the subject vehicle is running is downhill, and the delay time may be determined to be increased as a degree of inclination of the downhill road is increased.

The delay condition may include a condition in which an electrical load of the subject vehicle is less than a predetermined reference load, and the delay time may be determined to be increased as the electrical load is reduced.

The power generation in step (d) may be performed using the driving motor that is driven using the power of the engine after the driving motor and the engine are connected in a synchronized manner using an engine clutch when revolutions per minute (RPM) of the driving motor is increased to be greater than or equal to a predetermined minimum engine RPM in the state in which the subject vehicle is waiting to perform the power generation for the delay time.

Step (d) may include charging the battery with electricity produced by performing the power generation.

The power generation in step (d) may be performed using a hybrid starter generator (HSG) that is driven using the power of the engine unless RPM of the driving motor is increased to be greater than or equal to a predetermined minimum engine RPM until the delay time has elapsed.

Step (d) may include supplying electricity produced by performing the power generation to at least one of the driving motor and electrical components of the subject vehicle in preference to the battery.

The method may further include step (e) of comparing an electrical load of the subject vehicle with a predetermined reference load between step (a) and step (b) when it is determined that the subject vehicle is stopped in step (a), wherein the target SOC is adjusted to a predetermined first stop SOC that is less than the running SOC in step (b) when it is determined that the electrical load is less than the reference load in step (e), and the target SOC is adjusted to a predetermined second stop SOC that is less than the running SOC and greater than the first stop SOC in step (b) when it is determined that the electrical load is greater than or equal to the reference load in step (e).

The method may further include the steps of: (f) comparing the target SOC with a current SOC of the battery when the target SOC is adjusted to the stop SOC in step (b); and (g) performing power generation using an HSG that is driven using power of an engine when it is determined that the current SOC of the battery is less than the target SOC in step (f).

Step (g) may include supplying electricity produced by performing the power generation to at least one of the driving motor and electrical components of the subject vehicle in preference to the battery.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
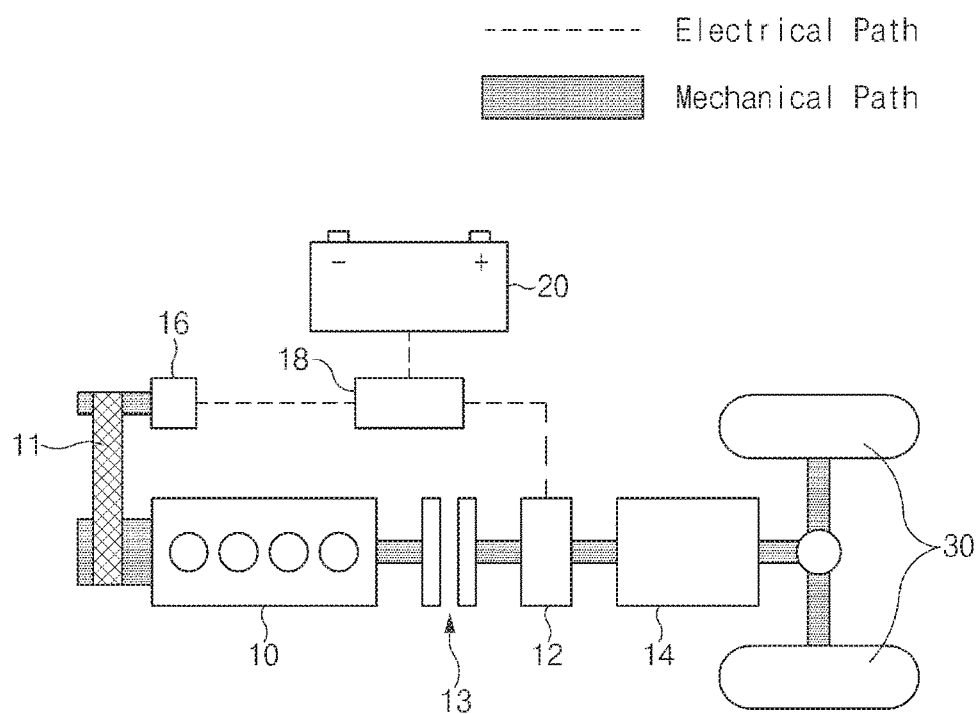
FIG. 1 schematically illustrates a configuration of a hybrid vehicle.

Hereinafter, exemplary embodiments of the present disclosure will be described in detail with reference to the accompanying drawings.

Terms or words used in the present specification and claims should not be interpreted as being limited to accepted meanings or dictionary definitions, but should be interpreted as having meanings and concepts that comply with the technical ideas of the present disclosure based on the principle by which an inventor can appropriately define the concepts of the terms or words in order to describe the disclosure in the best way. Therefore, the embodiments described in the specification and the configuration of elements illustrated in the drawings are merely considered to be exemplary embodiments and do not represent all the technical ideas of the present disclosure, and thus, it should be understood that various equivalents and modifications may exist at the time of filing this application.

In the drawings, the shapes and dimensions of elements may be exaggerated or schematically illustrated for convenience of explanation and clarity. In addition, a detailed description of a related known function or configuration will be omitted in order not to unnecessarily obscure the concepts of the present disclosure.

Throughout the specification, a subject vehicle refers to a vehicle to which a method for controlling a hybrid vehicle according to exemplary embodiments of the present disclosure is applied, and a preceding vehicle refers to a vehicle running in front of the subject vehicle. In addition, a target state of charge ($SOC_t$) refers to the SOC of a battery 20 corresponding to a reference point for starting power generation using a driving motor 12 or a hybrid starter generator (HSG) 16.

Figure 2:
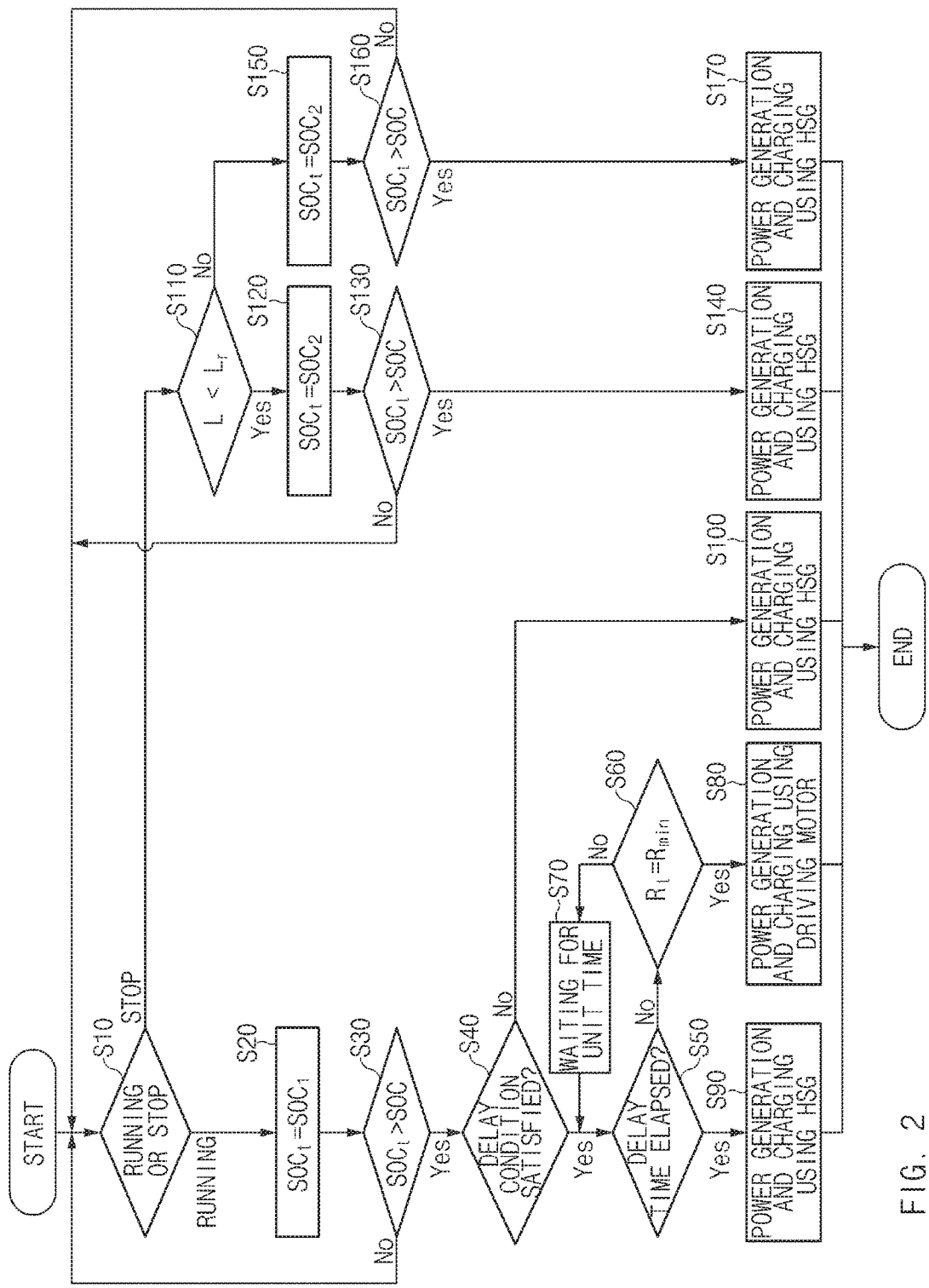
FIG. 2 illustrates a flowchart of a method for controlling a hybrid vehicle, according to exemplary embodiments of the present disclosure.

FIG. 2 illustrates a flowchart of a method for controlling a hybrid vehicle, according to exemplary embodiments of the present disclosure.

First, when the subject vehicle is driven in an electric vehicle (EV) mode, it may be determined whether or not the subject vehicle is running or stopped in step S10. The running or stopping state of the subject vehicle may be determined using a vehicle speed sensor, but the determination method is not limited thereto. In the method for controlling a hybrid vehicle according to exemplary embodiments of the present disclosure, a method for controlling the SOC of the battery 20 may vary depending on whether or not the subject vehicle is running or stopped.

Figure 3:
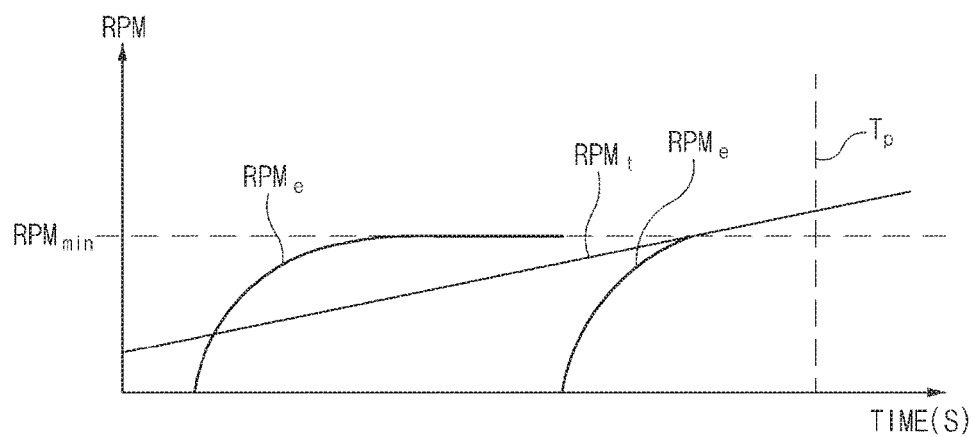
FIG. 3 is a graph that illustrates an introduction of delay time during power generation in a state in which a vehicle is running according to exemplary embodiments of the present disclosure.

FIG. 3 illustrates an introduction of delay time during power generation in a state in which a vehicle is running according to exemplary embodiments of the present disclosure.

Hereinafter, in the method for controlling a hybrid vehicle according to exemplary embodiments of the present disclosure, when it is determined in step S10 that the subject vehicle is running, a method for controlling the SOC of the battery 20 will be described.

First, a target SOC $SOC_t$ may be adjusted to a predetermined running SOC $SOC_1$ in step S20. The running SOC $SOC_1$ may be stored in a memory of the subject vehicle in advance.

Next, the target SOC $SOC_t$ adjusted to be equal to the running SOC $SOC_1$ may be compared with a current SOC of the battery 20 in step S30.

Thereafter, returning to step S10 when the current SOC of the battery 20 is greater than or equal to the target SOC $SOC_t$, may be determined whether or not the subject vehicle is running or stopped. On the contrary, when the current SOC of the battery 20 is less than the target SOC $SOC_t$, may be determined whether or not a current state of the subject vehicle satisfies a predetermined delay condition in step S40.

In general, while a hybrid vehicle is running in EV mode, if the SOC of the battery 20 is reduced to be less than the target SOC $SOC_t$, idle generation may be performed. The idle generation may be performed by applying an electrical load for power generation to the HSG 16 having a capacity smaller than that of the driving motor 12 using the power of an engine 10 in a state in which the engine 10 is driven at low rpm (revolutions per minute) and low torque. Thus, compared to power generation using the driving motor 12 in a state in which the engine 10 and the driving motor 12 are connected to each other in a synchronized manner, the idle generation may lead to reductions in fuel efficiency of the engine 10 and power generation and charging efficiency. Therefore, in order to improve the fuel efficiency of the engine 10 and the power generation and charging efficiency, it may be preferable to maximize the capacity for power generation using the driving motor 12 and minimize idle generation capacity in the total power generation capacity.

The delay condition may be provided to improve the fuel efficiency of the engine 10 and the power generation and charging efficiency, and may be a condition in which the synchronized connection of the engine 10 and the driving motor 12 is to be expected or a condition in which the efficiency is expected to be relatively good even if the idle generation is performed.

For example, the delay condition may be a condition in which a distance between the subject vehicle and the preceding vehicle is greater than or equal to a predetermined reference distance. This may take into consideration the following: when the distance between the subject vehicle and the preceding vehicle is relatively long, the subject vehicle may be accelerated, and thus there may be a high possibility that the revolutions per minute $RPM_t$ of the driving motor 12 is increased to a minimum engine RPM $RPM_{min}$. Here, the minimum engine RPM $RPM_{min}$ refers to a minimum RPM of the engine 10 for making the synchronized connection of the driving motor 12 and the engine 10 using an engine clutch 13.

For example, the delay condition may be a condition in which a running speed of the preceding vehicle is faster than or equal to a predetermined reference speed. This may take into consideration the following: when the preceding vehicle is running relatively quickly, the subject vehicle may be accelerated, and thus there may be a high possibility that the RPM $RPM_t$ of the driving motor 12 is increased to the minimum engine RPM $RPM_{min}$.

For example, the delay condition may be a condition in which a road on which the subject vehicle is running is downhill. This may take into consideration the following: when the subject vehicle is running on the downhill road, the subject vehicle may be accelerated, and thus there may be a high possibility that the RPM $RPM_t$ of the driving motor 12 is increased to the minimum engine RPM $RPM_{min}$.

For example, the delay condition may be a condition in which an electrical load L of the subject vehicle is greater than or equal to a predetermined reference load Lr. This may take into consideration the following: when the electrical load L is low, most of the electricity produced by performing the idle generation may be used to charge the battery 20, and thus, energy loss caused by the charging and discharging of the battery 20 may be increased. On the contrary, when the electrical load L is high, most of the electricity produced by performing the idle generation may be directly supplied to and consumed in the driving motor 12 and electrical components of the vehicle without passing through the battery 20, and thus, energy loss caused by the charging and discharging of the battery 20 may be reduced.

Then, when the current state of the subject vehicle satisfies the delay condition, it may be determined whether or not a delay time $T_p$ has elapsed in step S50.

The delay time $T_p$ may be provided to reduce the frequency of the idle generation, and may be a predetermined waiting time taken to start the power generation using the driving motor 12 by connecting the engine 10 and the driving motor 12 in the synchronized manner, without starting the idle generation using the HSG 16 immediately when it is determined that the SOC of the battery 20 is less than the target SOC $SOC_t$. The delay time $T_p$ may be determined to be increased as the possibility of synchronized connection of the engine 10 and the driving motor 12 is increased.

For example, the delay time $T_p$ may be increased as the distance between the subject vehicle and the preceding vehicle is increased. This may take into consideration the following: as the distance between the subject vehicle and the preceding vehicle is increased, the subject vehicle may be accelerated, and thus there may be a high possibility that the RPM $RPM_t$ of the driving motor 12 is increased to the minimum engine RPM $RPM_{min}$.

For example, the delay time $T_p$ may be increased as the speed of the preceding vehicle increases. This may take into consideration the following: as the speed of the preceding vehicle increases, the subject vehicle may be accelerated, and thus there may be a high possibility that the RPM $RPM_t$ of the driving motor 12 is increased to the minimum engine RPM $RPM_{min}$.

For example, the delay time $T_p$ may be increased as the degree of inclination of a downhill road on which the subject vehicle is running is increased. This may take into consideration the following: as the degree of inclination of the downhill road on which the subject vehicle is running is increased, the subject vehicle may be accelerated, and thus there may be a high possibility that the RPM $RPM_t$ of the driving motor 12 is increased to the minimum engine RPM $RPM_{min}$.

For example, the delay time $T_p$ may be determined to be increased as the electrical load L of the subject vehicle is reduced. This may take into consideration the following: when the electrical load L is high, most of the electricity produced by performing the idle generation may be supplied to and consumed in the driving motor 12 and electrical components of the vehicle and energy loss caused by the charging and discharging of the battery 20 may be reduced, and thus, the power generation and charging efficiency may be improved even if the idle generation is immediately performed without waiting until the engine 10 and the driving motor 12 are allowed to make the synchronized connection.

While the subject vehicle is waiting to perform the power generation for the delay time $T_p$, the RPM $RPM_t$ of the driving motor 12 and the minimum engine RPM $RPM_{min}$ may be compared in step S60. When the RPM $RPM_t$ of the driving motor 12 is less than the minimum engine RPM $RPM_{min}$, the waiting operation may be repeated for a predetermined unit time in step S70. The frequency of comparison and waiting may be counted by a counter circuit (not shown), and it may be determined whether or not the delay time $T_p$ has elapsed, on the basis of the frequency of comparison and waiting counted by the counter circuit. In the method for controlling a hybrid vehicle according to the exemplary embodiments of the present disclosure, the method for controlling the SOC of the battery 20 may vary depending on whether or not the RPM $RPM_t$ of the driving motor 12 is increased to the minimum engine RPM $RPM_{min}$ for the delay time $T_p$.

Figure 4:
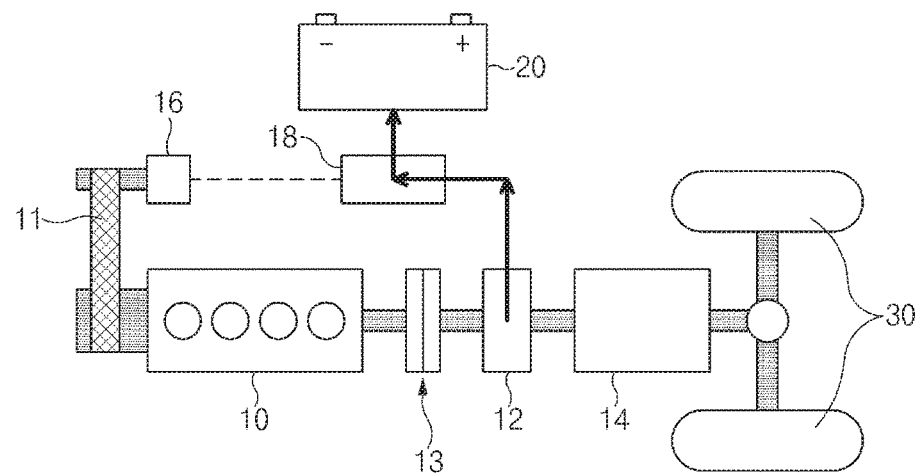
FIG. 4 is a schematic drawing that illustrates a process of storing electricity produced by performing power generation using a driving motor in a battery according to exemplary embodiments of the present disclosure.

For example, as illustrated in FIG. 3, while the subject vehicle is waiting to perform the power generation for the delay time $T_p$, when the RPM $RPM_t$ of the driving motor 12 is increased to the minimum engine RPM $RPM_{min}$, the engine 10 and the driving motor 12 may be connected in the synchronized manner using the engine clutch 13, thereby converting the driving mode of the subject vehicle into a hybrid electric vehicle (HEV) mode. After the mode conversion, electrical load for power generation may be applied to the driving motor 12 using the power of the engine 10, and thus, the power generation may be performed using the driving motor 12 in step S80. In other words, when the RPM $RPM_t$ of the driving motor 12 is increased to the minimum engine RPM $RPM_{min}$ during the waiting operation for the delay time $T_p$, the driving mode of the subject vehicle may be converted into the HEV mode, and then, the power generation may be performed using the driving motor 12. Compared to the idle generation using the HSG 16, the fuel efficiency of the engine 10 and the power generation and charging efficiency may be improved. Here, as illustrated in FIG. 4, the electricity produced using the driving motor 12 may be used to charge the battery 20, but is not limited thereto.

Meanwhile, as illustrated in FIG. 3, when the engine 10 and the driving motor 12 are connected in the synchronized manner, the engine 10 may be on standby until the RPM $RPM_t$ of the driving motor 12 is close to the minimum engine RPM $RPM_{min}$. When the RPM $RPM_t$ of the driving motor 12 is close to the minimum engine RPM $RPM_{min}$, the engine 10 may be activated to cause the RPM $RPM_t$ of the driving motor 12 and the RPM $RPM_e$ of the engine 10 to reach the minimum engine RPM $RPM_{min}$ simultaneously. Thus, this may minimize fuel loss caused by the idling of the engine 10 until the RPM $RPM_t$ of the driving motor 12 is increased to the minimum engine RPM $RPM_{min}$.

For example, unless the RPM $RPM_t$ of the driving motor 12 is increased to the minimum engine RPM $RPM_{min}$ until the delay time $T_p$ has elapsed, electrical load for power generation may be applied to the HSG 16 using the power of the engine 10 in a state in which the engine 10 and the driving motor 12 are disconnected, such that the idle generation may be performed using the HSG 16 in step S90. In other words, unless the RPM $RPM_t$ of the driving motor 12 is increased to the minimum engine RPM $RPM_{min}$ until the delay time $T_p$ has elapsed, the engine may be activated in a state in which the driving mode of the subject vehicle is maintained in the EV mode, and thus, the idle generation may be performed using the HSG 16.

Figure 5:
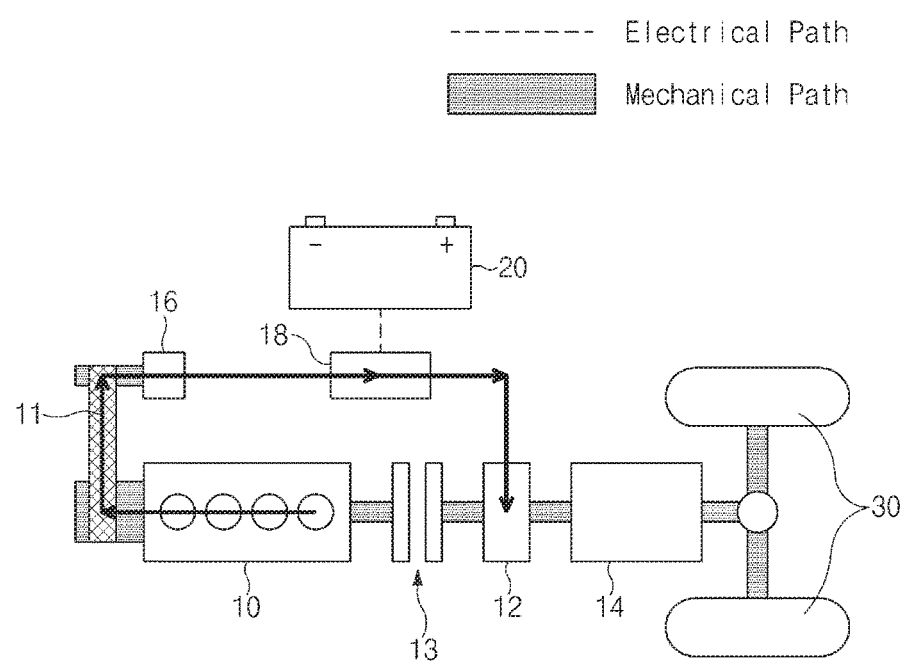
FIG. 5 is a schematic drawing that illustrates a process of supplying electricity produced by performing idle generation using a hybrid starter generator (HSG) to a driving motor and electrical components of a vehicle according to exemplary embodiments of the present disclosure.

As illustrated in FIG. 5, electricity produced by performing the idle generation may be preferentially supplied to, and used in, at least one of the driving motor 12 and the electrical components, and then, residual electricity may be used to charge the battery 20. Thus, energy loss caused by the charging and discharging of the battery 20 may be reduced.

Meanwhile, unless the current state of the vehicle satisfies the delay condition, as illustrated in FIG. 3, there may be no need to wait until the delay time $T_p$ has elapsed, and electrical load for power generation may be applied to the HSG 16 using the power of the engine 10 in a state in which the engine 10 and the driving motor 12 are disconnected, whereby the idle generation may be performed using the HSG 16 in step S100. After electricity produced by performing the idle generation is preferentially supplied to at least one of the driving motor 12 and the electrical components, residual electricity may be used to charge the battery 20. Thus, energy loss caused by the charging and discharging of the battery 20 may be reduced.

Figure 6:
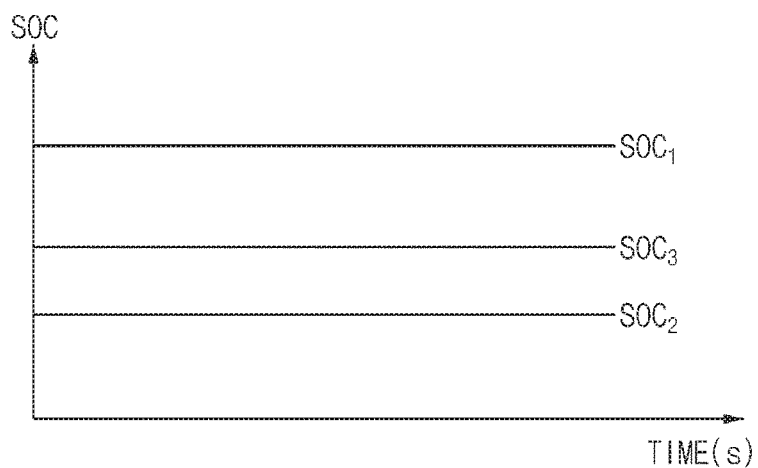
FIG. 6 illustrates a method for controlling target state of charge (SOC), according to whether or not a vehicle is running and according to the magnitude of electrical load according to exemplary embodiments of the present disclosure.

FIG. 6 illustrates a method for controlling target SOC $SOC_t$, according to whether or not a vehicle is running and according to a magnitude of electrical load.

Hereinafter, in the method for controlling a hybrid vehicle according to exemplary embodiments of the present disclosure, when it is determined in step S10 that the subject vehicle is stopped, a method for controlling the SOC of the battery 20 will be described.

When the subject vehicle is stopped, electric power required by the driving motor 12 is low compared to when the subject vehicle is running, and thus, the possibility of full-discharge of the battery 20 may be relatively low. Thus, in the method for controlling a hybrid vehicle according to exemplary embodiments of the present disclosure, as illustrated in FIG. 6, when the subject vehicle is stopped, the target SOC $SOC_t$ may be adjusted to predetermined stop SOCs $SOC_1$ and $SOC_2$ that are less than the running SOC $SOC_1$, and thus, the frequency of idle generation may be reduced. Based on this assumption, when it is determined that the subject vehicle is stopped, the method for controlling the SOC of the battery 20 will be described in more detail.

First of all, an electrical load L of the subject vehicle may be compared with a predetermined reference load $L_r$ in step S110. In the method for controlling a hybrid vehicle according to exemplary embodiments of the present disclosure, the method for controlling the SOC of the battery 20 may vary depending on the comparison results of the electrical load L and the reference load $L_r$.

For example, as illustrated in FIG. 6, when the electrical load L is less than the reference load Lr, the target SOC $SOC_t$ may be adjusted to a predetermined first stop SOC $SOC_2$ that is less than the running SOC $SOC_1$ in step S120. Thus, the frequency of idle generation may be reduced, whereby the fuel efficiency of the engine 10 and the power generation and charging efficiency may be improved. The first stop SOC $SOC_2$ may be stored in the memory of the subject vehicle in advance.

Next, the target SOC $SOC_t$ adjusted to be equal to the first stop SOC $SOC_2$ may be compared with a current SOC of the battery 20 in step S130. Thereafter, returning to step S10 when the current SOC of the battery 20 is greater than or equal to the target SOC $SOC_t$, t may be determined whether or not the subject vehicle is running or stopped in S10. On the contrary, when the current SOC of the battery 20 is less than the target SOC $SOC_t$, electrical load for power generation may be applied to the HSG 16 using the power of the engine 10 in a state in which the engine 10 and the driving motor 12 are disconnected, such that the idle generation may be performed using the HSG 16 in step S140. In other words, when the current SOC of the battery 20 is less than the target SOC $SOC_t$, the idle generation may be performed using the HSG 16 in a state in which the driving mode of the subject vehicle is maintained in the EV mode. As illustrated in FIG. 5, electricity produced by performing the idle generation may be preferentially supplied to and used in at least one of the driving motor 12 and the electrical components, and then, residual electricity may be used to charge the battery 20. Thus, energy loss caused by the charging and discharging of the battery 20 may be reduced.

For example, when the electrical load L is greater than or equal to the reference load Lr, as illustrated in FIG. 6, the target SOC $SOC_t$ may be adjusted to a predetermined second stop SOC $SOC_3$ that is less than the running SOC $SOC_1$ and greater than the first stop SOC $SOC_2$ in step S150. In other words, when the electrical load L is greater than or equal to the reference load Lr, the target SOC $SOC_t$ may be adjusted to the second stop SOC $SOC_3$ that is greater than the first stop SOC $SOC_2$ so as to increase the frequency of idle generation, compared to when the electrical load L is less than the reference load Lr. This may take into consideration the following: compared to when the electrical load L is low, when the electrical load L is high, the amount of electricity to be directly supplied to and used in the driving motor 12 and the electrical components, without passing through the battery 20, among the electricity produced by performing the idle generation may be increased, and thus, efficient power generation and charging may be enabled even if the frequency of idle generation is increased.

Then, the target SOC $SOC_t$ adjusted to be equal to the second stop SOC $SOC_3$ may be compared with the current SOC of the battery 20 in step S160. Thereafter, returning to step S10 when the current SOC of the battery 20 is greater than or equal to the target SOC $SOC_t$, it may be determined whether or not the subject vehicle is running or stopped in S10. On the contrary, when the current SOC of the battery 20 is less than the target SOC $SOC_t$, electrical load for power generation may be applied to the HSG 16 using the power of the engine 10 in a state in which the engine 10 and the driving motor 12 are disconnected, such that the idle generation may be performed using the HSG 16 in step S170. In other words, when the current SOC of the battery 20 is less than the target SOC $SOC_t$, the idle generation may be performed using the HSG 16 in a state in which the driving mode of the subject vehicle is maintained in the EV mode. As illustrated in FIG. 5, electricity produced by performing the idle generation may be preferentially supplied to and used in at least one of the driving motor 12 and the electrical components, and then, residual electricity may be used to charge the battery 20. Thus, energy loss caused by the charging and discharging of the battery 20 may be reduced.

As set forth above, the method for controlling a hybrid vehicle according to exemplary embodiments may reduce the frequency of idle generation using the HSG by adjusting the target SOC differently according to whether the vehicle is running or stopped, thereby improving the fuel efficiency of the engine and the power generation efficiency.

In addition, when the SOC of the battery is reduced to be less than the target SOC in a state in which the vehicle is running, the vehicle is waiting to perform the power generation using the driving motor through the synchronized connection of the driving motor and the engine for the predetermined delay time, without immediately performing the idle generation using the HSG. This may reduce the frequency of idle generation, thereby improving the fuel efficiency of the engine and the power generation efficiency.

Furthermore, when the electrical load is less than the predetermined reference load in a state in which the vehicle is stopped, the target SOC may be adjusted to be relatively low compared to when the electrical load is greater than or equal to the reference load. This may reduce the frequency of idle generation, thereby improving the fuel efficiency of the engine and the power generation efficiency.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A method for controlling a hybrid vehicle, the method comprising the steps of:
(a) determining whether or not a subject vehicle is running or stopped, when the subject vehicle is in an electric vehicle (EV) mode and is driven by power of a driving motor;
(b) adjusting a target state of charge (SOC) of a battery depending on whether or not the subject vehicle is running or stopped;
(c) comparing the target SOC with a current SOC of the battery; and
(d) performing power generation using power of an engine when it is determined that the current SOC of the battery is less than the target SOC in step (c),
wherein, in step (d), a start of the engine is delayed up to a predetermined delay time until a revolutions-per-minute (RPM) of the driving motor rises close to a predetermined minimum engine RPM such that the power generation is performed after the engine and the driving motor are connected in a synchronized manner, the predetermined minimum engine RPM being an engine RPM for making the synchronized connection of the driving motor and the engine using an engine clutch.

2. The method according to claim 1, wherein the power generation in step (d) is performed when a predetermined delay condition is satisfied in a state in which the subject vehicle is waiting to perform the power generation for the predetermined delay time.

3. The method according to claim 2, wherein the delay condition comprises a condition in which a distance between the subject vehicle and a preceding vehicle in front of the subject vehicle is greater than or equal to a predetermined reference distance, and
the delay time is increased as the distance between the subject vehicle and the preceding vehicle is increased.

4. The method according to claim 2, wherein the delay condition comprises a condition in which a running speed of a preceding vehicle in front of the subject vehicle is greater than or equal to a predetermined reference speed, and
   the delay time is increased as the running speed is increased.

5. The method according to claim 2, wherein the delay condition comprises a condition in which a road on which the subject vehicle is running is downhill, and
   the delay time is increased as a degree of inclination of the downhill road is increased.

6. The method according to claim 2, wherein the delay condition comprises a condition in which an electrical load of the subject vehicle is less than a predetermined reference load, and
   the delay time is increased as the electrical load is reduced.

7. The method according to claim 1, wherein step (d) comprises charging the battery with electricity produced by performing the power generation.

8. The method according to claim 1, wherein the power generation in step (d) is performed using a hybrid starter generator (HSG) that is driven using the power of the engine unless an RPM of the driving motor is increased to be greater than or equal to the predetermined minimum engine RPM until the delay time has elapsed.

9. The method according to claim 8, wherein step (d) comprises supplying electricity produced by performing the power generation to at least one of the driving motor and electrical components of the subject vehicle in preference to the battery.

10. The method according to claim 1, further comprising step (e) of comparing an electrical load of the subject vehicle with a predetermined reference load between step (a) and step (b) when it is determined that the subject vehicle is stopped in step (a),
   wherein the target SOC is adjusted to a predetermined first stop SOC that is less than the running SOC in step (b) when it is determined that the electrical load is less than the reference load in step (e), and
   the target SOC is adjusted to a predetermined second stop SOC that is less than the running SOC and greater than the first stop SOC in step (b) when it is determined that the electrical load is greater than or equal to the reference load in step (e).

* * * * *